United States Patent

Shiba et al.

[11] Patent Number: 5,126,987
[45] Date of Patent: Jun. 30, 1992

[54] INFORMATION REPRODUCING APPARATUS

[75] Inventors: Takahumi Shiba; Hiroyasu Eguchi, both of Tokorozawa, Japan

[73] Assignee: Pioneer Electronic Corporation, Tokyo, Japan

[21] Appl. No.: 554,995

[22] Filed: Jul. 20, 1990

[30] Foreign Application Priority Data

Sep. 22, 1989 [JP] Japan .................................. 1-246745

[51] Int. Cl.⁵ ...................... G11B 19/00; G11B 15/18; G11B 7/00; H04M 11/10
[52] U.S. Cl. ........................................ 369/32; 369/27; 369/39; 360/722
[58] Field of Search ...................... 360/32, 77.13, 72.1, 360/72.2, 71; 369/32, 39, 27, 30

[56] References Cited

U.S. PATENT DOCUMENTS

| 4,301,482 | 11/1981 | Trevithick | 369/32 |
| 4,496,997 | 6/1985 | Ohtsuki | 360/32 |
| 4,839,755 | 6/1989 | Yamada et al. | 360/32 |
| 4,899,233 | 2/1990 | Yoshida | 360/77.13 |
| 4,991,159 | 2/1991 | Tomoda et al. | 369/32 |

Primary Examiner—Roy N. Envall, Jr.
Assistant Examiner—Nabil Hindi
Attorney, Agent, or Firm—Sughrue, Mion, Zinn, Macpeak & Seas

[57] ABSTRACT

In CDs, LVDs, DATs and so forth, reproduction is made from a section after a fixed time (a fixed number of tracks) lapse from the head rather than reproducing from the head of a plurality of information pieces. In these intermediate sections are entered, for example, vocals, and therefore the operator can select a desired information piece easily.

6 Claims, 3 Drawing Sheets

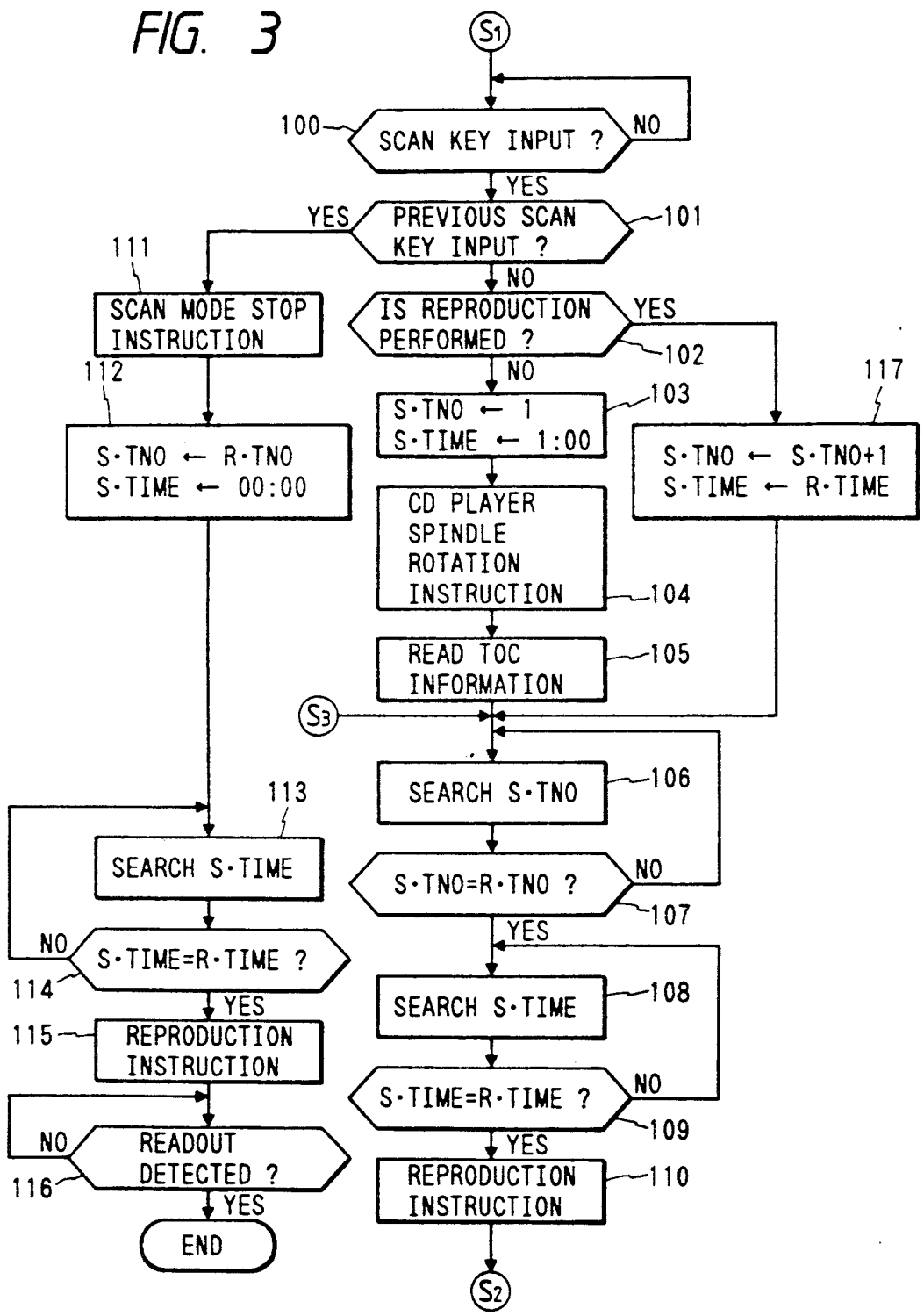

INFORMATION REPRODUCING APPARATUS

BACKGROUND OF THE INVENTION

1. Field of the Invention

The present invention relates to an information reproducing apparatus and, in particular, to an apparatus and method in which information pieces, such as a plurality of musical compositions or the like, which are recorded on a recording medium partitioned by address data, are scanned and reproduced.

2. Description of the Related Art

A plurality of information pieces (e.g., musical composition data) which are partitioned by address data (relative addresses) are recorded chronologically (in time-series manner) on CDs (compact disks), LVDs (laser vision disks), DATs (digital audio tapes) and so forth. When a plurality of such information pieces exist, it is sometimes desired to know the essence of them in a short time. For this reason, a CD player has incorporated various kinds of additional functions in addition to the primary function of reproducing a musical composition. The additional functions include introduction scanning. The introduction scanning is an operation mode in which, when it is desired to confirm what kind of music is recorded on a CD or to know a desired piece of music in a short time, the introduction to each music piece track TNo. 1, TNo. 2, . . . is reproduced for a predetermined time (for example, 10 secs.), as shown in FIG. 5.

SUMMARY OF THE INVENTION

According to the above-mentioned conventional introduction scanning method, since only the introduction to each music piece track TNo. 1, TNo. 2, . . . is reproduced one after another, it is sometimes difficult to grasp the substance of the musical composition, depending upon the kind of music piece. For example, in the case of a music piece containing vocals, it may jump to the next music piece before the song has started, and therefore grasping the essential substance is impossible.

Accordingly, an object of the present invention is to provide an information reproducing apparatus which allows scanning capable of easily reproducing the substance of each information piece when scanning a plurality of information pieces partitioned by address data in a recording medium.

In order to solve the above-mentioned problems, an information reproducing apparatus of the present invention that reproduces a plurality of information pieces partitioned by address data and chronologically recorded in a recording medium includes a control means for controlling so as to continuously reproduce an intermediate portion of each of the information pieces.

Accordingly to the present invention, the control means controls the information reproducing apparatus so that only an intermediate portion, for example, corresponding to a song or vocal, in each information piece is reproduced in turn continuously for a predetermined time. Therefore, since the portion where the substance of each information piece is easily grasped is often the intermediate portion, searching information pieces and accurately grasping the substance of each information piece are made possible.

These and other objects, features and advantages of the present invention will become clear when reference is made to the following description of the preferred embodiments of the present invention, together with reference to the accompanying drawings.

BRIEF DESCRIPTION OF THE DRAWINGS

FIG. 3 is a control flowchart illustrating an embodiment of the present invention;

DESCRIPTION OF THE PREFERRED EMBODIMENT

An embodiment of the present invention will be explained with reference to the accompanying drawings.

Figure 1:
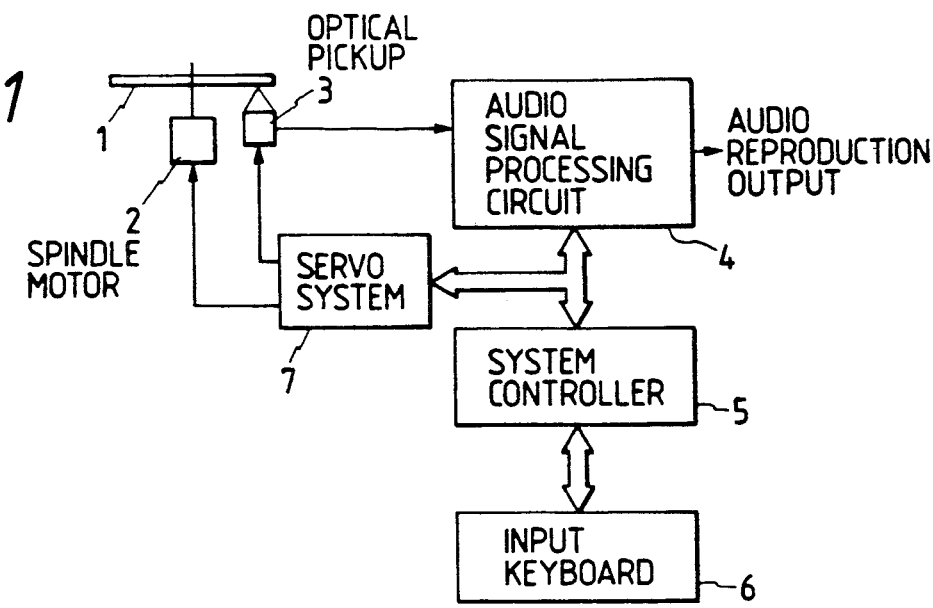
FIG. 1 is an outline block diagram of an information reproducing apparatus of the present invention.

First, a description will be given with respect to the outline of a CD player as an example of an information reproducing apparatus. FIG. 1 shows the outline configuration of a CD player. A CD player, while being rotated by a spindle motor 2, reads out recorded information on a CD 1 using an optical pickup 3, performs signal processing such as amplification, demodulation, D/A conversion and so on with respect to the reproduced signal in an audio signal processing circuit 4, and outputs audio reproduction information. Tracking servo control and spindle servo control are performed on the spindle motor 2 by a servo system 7 under the control of a system controller 5. Likewise, focusing servo control is performed on the optical pickup 3 by the system controller 5 via the servo system 7. Numeral 6 denotes an input keyboard for giving operation instructions to a CD player.

Figure 2A:
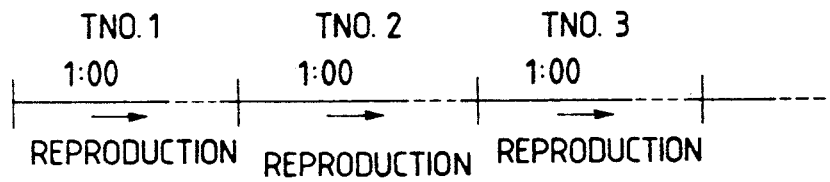
FIGS. 2A and 2B is an explanatory view of a scan method of the present invention.

The system controller 5 comprises a CPU and controls the scanning operation of the present invention in accordance with a present control program. That is, as shown in FIG. 2(a), the scanning operation is performed by reproducing the intermediate portion of each music piece TNo.1, TNo. 2, . . . one after another for a predetermined time. Not only does the system controller 5 control the above-mentioned scanning operation, but it also controls other general operations. Because these general operations are not directly related to the present invention, the explanation thereof is omitted.

Next, the scanning operation of the present invention as well as the details of the system controller 5 will be explained (See FIGS. 3 and 4).

When scanning is performed, the scan key (not shown) of an input keyboard 6 is pressed. The system controller 5 checks the presence of a scan key input (step 100). Where there was a scan key input (YES in step 100), the process proceeds to step 101. In step 101, whether or not a scan key has already been input before this scan key is input is checked. The reason for this is that when a desired composition is found during a search, the scan mode is stopped by pressing the scan key two times so that the composition can be reproduced from the beginning or head of the composition. In this case, the processes of steps 111 to 116 are performed. The details thereof will be described later. In the alternative, the contents of step 101 may be the judgement of whether or not the stop key for stopping reproduction has been pressed instead of the judgement of whether or not the scan key has been pressed.

Now, supposing that the judgment in step 101 is NO, when performing scanning, the process proceeds to the next step 102. In step 102, whether or not the CD player is reproducing at present is checked. The reason for this is that the scan key may be pressed during reproduction. In that case, it is necessary to start scanning operation from a composition next to the composition being reproduced at present. If the CD player is reproducing (YES), the process proceeds to step 117, which will be described later.

Supposing that the judgment in step 102 is NO, the process proceeds to step 103 if the CD player is not reproducing. In step 103, "1" is set to a search track number S·TNO and "1:00" (1 min.) is set to a search relative address S·TIME. That is, a search start track is set at the first track of the CD and initialization is performed so as to start reproducing at a point after a one minute lapse from the top address of each composition (FIG. 2a). The value which is set to S·TIME can be any and it may be input from the input keyboard by estimating the time at which the vocals are thought to be started after the introduction portion is ended.

Next, the process proceeds to step 104 where the rotation instruction of the spindle motor 2 of the CD player is output to the servo system 7, causing the CD 1 to rotate.

Next, the process proceeds to step 105 where the TOC information stored in the CD 1 is read and control data required for the processes of step 106 and the following processes are retrieved.

Next, the process proceeds to step 106 where a search tracks number S·TNO is searched on the basis of data read by the optical pickup 3. In step 107, it is checked whether or not the currently read track number R·TNO coincides with the set search track number S·TNO (=1) and the search is performed until both coincide with each other. When S·TNO=R·TNO (YES), since this means that the reading position of the optical pickup 3 has reached the track position of the first musical composition, it is then necessary to search a search relative address S·TIME that indicates the reproduction start position of the composition which starts at the track. This search is performed in steps 108 and 109.

The search instruction of a search relative address S·TIME is issued in step 108. In step 109, it is checked whether or not the currently read relative address R·TIME coincides with the search relative address S·TIME (=1:00) and the search is performed until both coincide with each other. When S·TIME=R·TIME (YES), this means that the reading position of the optical pickup 3 has reached a reproduction start address and a reproduction instruction is issued in the next 110. This reproduction is therefore performed from an intermediate portion (position after an one min. lapse) of a composition from where the search is started.

Figure 4:
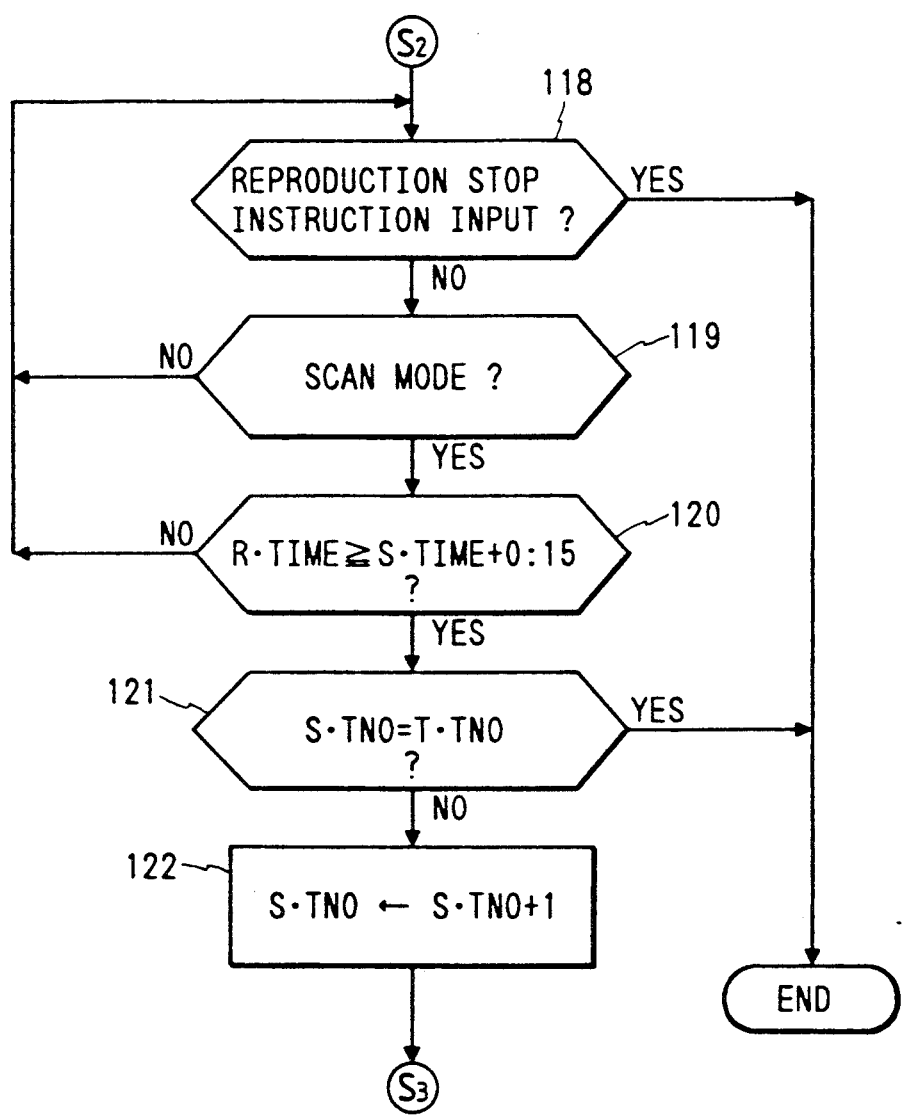
FIG. 4 is a control flowchart illustration an embodiment of the present invention.

Next, reference is made to FIG. 4. When a reproduction starts at the search relative address S·TIME=1:00 of a composition of the search track number S·TNO=1 set in step 103 in this manner, it is checked whether or not a reproduction stop instruction has been input in step 118. If the reproduction stop instruction has been input (YES), all search processes are terminated and the process proceeds to another process which is not related to the present invention. If the reproduction stop instruction has not been input (NO), whether or not the process is currently in the scan mode is checked in step 119 and in the case of the scan mode, the process proceeds to the next step 120.

In step 120, it is checked whether or not the read relative address R·TIME has elapsed by the time such that "0:15" (15 secs.) is added to the search relative address S·TIME. In other words, this process is one for performing scanning and reproduction, which started at the search relative address S·TIME=1:00, for 15 secs. After a 15 sec. lapse (YES), the process proceeds to step 121.

In step 121, it is checked whether or not the search track number S·TNO coincides with the last track number T·TNO. This step 121 is one for checking whether or not the scanning and reproduction is performed on all the tracks in the CD 1. Since at present the search track number S·TNO=1, the judgment result is NO and the process proceeds to step 122.

In step 122, since the termination of the 15-sec. scanning and reproduction of a composition of the search track number S·TNO=1 has been confirmed in step 120, the preparation for scanning and reproduction of the composition of the next search track number S·TNO are made. That is, the value of the search track number S·TNO, which up to the present time is 1, is incremented by 1 and the incremented value is set to the search track number S·TNO. As a result of this setting, the target track to be scanned and reproduced after this becomes a search track number S·TNO=2. Then, the process again changes to the flow shown in the chart in FIG. 3, as shown in S3, and the same processes as above, beginning with step 106, are repeated.

In this way, when scanning starts (step 100) by the input of the scan key, scanning and reproduction tracks are searched (steps 106 and 107). Then, after the reproduction start address of the composition with respect to each scanned track is searched (step 108 and 109), an intermediate portion of the composition is reproduced for 15 secs. (steps 110 and 120). The series of processes described above are repeatedly performed for all the compositions in the CD 1 in the other of each music piece TNo. 1, TNo. 2, . . . (steps 121 and 122). The outline of this process is as shown in FIG. 2(a). The above is the basic operation flow of the scan mode.

Next, an exceptional process flow will be explained.

Processes, in the case where a desired composition is found during the scan mode, are performed in steps 101 and 111 to 116. When a desired composition is found during scanning, the scan key should be pressed once more (a total of two times). Then, since the judgement result of step 101 is YES, the process proceeds to step 11.

In step 111, a scan mode stop instruction is issued to stop the execution of step 102 and the successive steps. Then, the process proceeds to step 112.

In step 112, the currently read track number R·TNO is set to the search track number S·TNO and "00:00" (head of a composition) is set to the search relative address S·TIME. This setting means that the track number of a desired composition and the head position thereof have been set. Then, in steps 113 and 114, a search is carried out until the read relative address R·TIME coincides with the set search relative address S·TIME (=00:00). When the reading position of the optical pickup 3 reaches the search relative address S·TIME (step 114, YES), a reproduction instruction is issued and the desired composition is reproduced. After this, unless otherwise interrupted, the reproduction is continued up to the composition on the last track of the CD 1, and, when a readout is detected, all processes are terminated (step 116).

On the other hand, when there occurs a scan key input during reproduction, because the judgement result of step 102 becomes YES, the process proceeds to step 117. That is, when there occurs a scan key input during reproduction, scanning must be started from the next composition of a composition being reproduced at present. Thus, in step 117, the value of the currently set search track number S·TND is incremented by 1 and a new search track number S·TIME is set. At the same time, the value of the currently read relative address R·TIME is set to the value of the search relative address S·TIME. This means that if the scan key is pressed during reproduction, its scanning and reproduction start address is stored and the scanning and reproduction that starts at the next composition is performed at the address at which the scan key is pressed. Then, the search track number S·TNO of the next composition is set and the pickup moves to the track position after a one min. lapse from the head of the next composition and the next composition is reproduced. Therefore, by taking into account the fact that the length of time of an introduction portion differs from composition to composition, when it is desired to scan and reproduce the vocal portion, first, the first composition is reproduced normally and when vocals appear while listening to the composition, the scan key is pressed. The time from the head of the first composition to the time when the vocals appear is calculated and if the time is added to the time until the vocal appears to determine S·TIME, the possibility that a vocal section can be reproduced in the scanning and reproduction there after can be increased. As described above, it has the function of suitably setting the search relative address S·TIME by the user.

The above embodiment is disclosed for the case where, when each music piece TNo. 1, TNo. 2, ... is scanned and reproduced, as shown in FIG. 2(a), the search track number S·TNO is fixed and reproduction is made at the same address at all times on the basis of the head of a composition as a reference. However, the application of the present invention is not limited to this embodiment.

That is, according to a CD, there is a case that the playing time of a piece of music is different from other pieces of music. Especially, in case that the playing time of a certain piece of music is extremely short, the reproduction start address may be positioned at a position of the last part of the music piece if the search relative address S·TIME is set uniformly as "1:00".

Figure 2B:
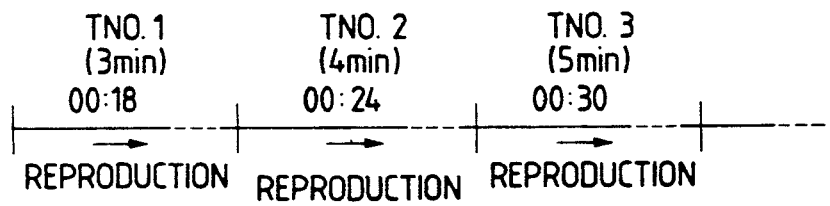
Figure 5:
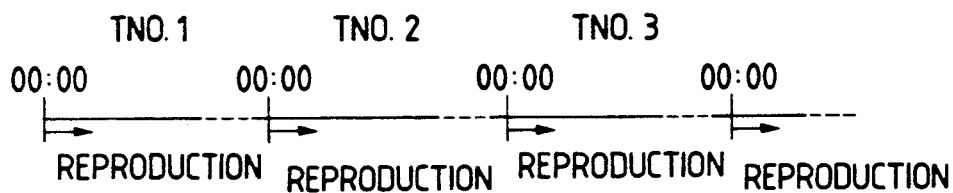
FIG. 5 is an explanatory view of a conventional introduction scan method.

For example, as shown in FIG. 2(b), in case that the playing time of each music piece is different from each other in a manner that a first piece (TNo.1) is three minutes, a second piece (TNo. 2) is four minutes and a third piece (TNo.3) is five minutes, each search relative address S·TIME may be set in accordance with the playing time of each music piece. In FIG. 2(b), S·TIME=00:18 in TNo. 1, S·TIME =00:24 in TNo. 2, and S·TIME=00:30 in TNo. 3.

The above-mentioned embodiment was explained using a CD player as an example. The apparatus is not limited to this application. The application of the present invention is possible for any apparatus which reproduces a recording medium in which composition information as well as address data are recorded. For example, the present invention can be used in a DAT having the same signal format as that of a CD. In addition, the present invention can be used in a LVD player. Since a chapter number indicating the separation of the recorded contents and a frame number indicating the separation of screens are recorded, these chapter numbers and frame numbers can be used as address data. Thus, first, a chapter number is scanned and then a frame number is searched. If reproduction is made from a predetermined number of frames, the scanning and reproduction of intermediate portions are made possible.

As has been described, according to the present invention, since only the intermediate portion of each information piece is reproduced continuously one after another, the most effective portion can be reproduced when reproducing the substance of each information piece in a short time and searching information pieces is made easy.

Many widely different embodiments of the present invention can be made without departing from the spirit and scope thereof, therefore it is to be understood that this invention is not limited to the specific embodiments thereof except as defined in the appended claims.

What is claimed is:

1. An information reproducing apparatus that reproduces a plurality of information pieces which are partitioned by start address data and are chronologically recorded on a recording medium, said apparatus comprising:

reading means for reading and reproducing said information pieces; and control means for controlling said reading means so as to continuously scan and reproduce only an intermediate portion of each of said plurality of information pieces, wherein said intermediate portion has an address greater than the start address of its respective information piece, but less than a start address of any successive information piece.

2. An information reproducing apparatus as claimed in claim 1, wherein said control means controls said reading means so as to start reproducing at the start address of one of said plurality of information pieces when said one information piece coincides with a desired target information piece at the time of the scanning and reproduction of said intermediate portion.

3. An information reproducing apparatus as claimed in claim 1, wherein said control means calculates the positions of the intermediate portions of said information pieces relative to said address data used to partition said information pieces.

4. An information reproducing apparatus as claimed in claim 1, wherein said control means calculates the position of the intermediate portion of an information piece to be scanned and reproduced by determining the absolute difference amount between the reproduction start address of one information piece and the address corresponding to a selected termination position of said reading means.

5. An information reproducing apparatus as claimed in claim 1, wherein, said control means controls said reading means so as to scan and reproduce an information piece positioned next to an information piece reproduced during normal reproduction in response to a scanning and reproduction instruction.

6. An information reproducing apparatus as claimed in claim 1, wherein said information piece, in the intermediate portion of which are recorded voices or vocals, is musical information.

* * * * *